Patented Aug. 17, 1948

2,447,052

UNITED STATES PATENT OFFICE 2,447,052

PAINT REMOVER

Donald C. Bond, Northbrook, and George G. Bernard, Evanston, Ill., assignors to The Pure Oil Company, Chicago, Ill., a corporation of Ohio No Drawing. Application June 25, 1945, Serial No. 601,538

1 Claim. (Cl. 252—160)

This invention relates to compositions suitable as paint removers, and is particularly directed to a composition suitable for removing paint from vertical steel surfaces.

An object of the invention is to provide a composition suitable for use as a paint remover.

A further object of the invention is to provide a method for removing paint from steel surfaces.

Other objects of the invention will become manifest from the following description.

We have discovered that an effective paint remover can be prepared by mixing with a caustic alkali solution a sufficient amount of gelling agent to convert the solution into a gel of such consistency as to be able to adhere to a vertical surface when applied thereto by brushing or spraying. As caustic alkali solutions useful in accordance with our invention are included aqueous solutions of sodium and/or potassium hydroxide containing from about 5 per cent of the alkali to an amount sufficient to saturate the solution. We prefer to use sodium hydroxide in preparing the composition because of its cheapness.

As a gelling agent we prefer to use bentonite in an amount of approximately 10 to 20 per cent by weight of the composition. Other inorganic gelling agents such as hydrous oxide gels of iron and cerium and organic gelling agents such as starch, proteins and various gums may also be used. The composition may be prepared by stirring the gelling agent into the caustic alkali solution until the mixture assumes a gelled condition.

Our invention also contemplates the use of alkali solutions containing solubility promoters of the type which cause solution in the alkali solution of substantial amounts of organic solvents. Solutions contemplated by this invention are those disclosed in Patents Nos. 2,316,753 and 2,316,759 for extracting mercaptans from gasoline and other hydrocarbon oils. It has been discovered that alkali solutions containing naphthenic acids and cresols, as disclosed in Patent No. 2,316,753, and alkali solutions containing acidic petroleum oxidation products, as disclosed in Patent No. 2,316,759, have the ability to dissolve substantial amounts of organic paint solvents. For example, a solution containing 18.3 parts by weight of sodium hydroxide, 18.7 parts by weight of naphthenic acids, 6.3 parts by weight of cresols and 56.7 parts by weight of water, will dissolve approximately 6.5 per cent by volume of n-heptane, 9.5 per cent by volume of benzene or 9.5 parts by volume of toluene at 100° F. A solution containing 20 per cent by weight of sodium hydroxide, 20 per cent by weight of "Alox 400" and 60 per cent by weight of water at 100° C. will dissolve 9 parts by volume of n-heptane and 18 parts by volume of toluene at 100° C. By utilizing alkali solutions containing solubilizing agents for organic paint solvents such as toluene, acetone and petroleum naphtha, such solvents can be incorporated in the composition in an amount up to the point of saturation of the alkali solution and thereby aid in removing paint from the surfaces which it is desired to clean.

In accordance with our invention the gel composition at atmospheric temperature or at elevated temperature up to the boiling point of the alkali solution, is applied to the surface to be cleaned in any suitable manner, as for example by brushing or spraying so that the surface is completely covered with a coating of the gel, and the coating of gel is permitted to remain on the surface for a period of approximately one hour or more, after which it is washed off with water and the surface lightly brushed with a little water in order to remove the loosened paint.

In order to demonstrate the effectiveness of compositions made in accordance with our invention a test strip was cut from an old oil tank having a coating of paint on the inner side. A gel containing 10 per cent of bentonite 0.5, per cent of arsenious oxide and the balance a 10 per cent hydrochloric acid solution, was applied to the painted surface and allowed to stand for two hours, after which the coating was removed. The paint was not affected by this treatment. A similar test plate was coated with a ¼ inch layer of the gel made by mixing together 70 per cent water, 20 per cent caustic soda and 10 per cent of bentonite. After one hour the gel was washed off with water and the treated surface was lightly brushed with a little water. The paint was completely removed from the surface by this treatment.

It will be seen, therefore, that we have succeeded in providing a composition and a method for removing paint from and cleaning steel surfaces which are difficult to clean by known methods and compositions.

It is claimed:

A paint removing composition consisting essentially of a solution containing at least 5 per cent by weight of an alkali selected from the group consisting of sodium and potassium hydroxide in water, a solubility promoter for hydrocarbon solvents from the group consisting of acidic petroleum oxidation products and a mixture of naphthenic acids and cresols, sufficient hydrocarbon paint solvent to substantially saturate said solution and bentonite in quantity sufficient to give said composition the consistency of a gel capable of adhering to a vertical surface when said composition is brushed or sprayed onto said surface.

DONALD C. BOND.
GEORGE G. BERNARD.

REFERENCES CITED

The following references are of record in the file of this patent:

UNITED STATES PATENTS

| Number | Name | Date |
|---|---|---|
| 553,666 | Pfaffle | Feb. 5, 1895 |
| 1,167,640 | Ellis | Jan. 11, 1916 |
| 1,181,361 | Wessel | May 2, 1916 |
| 1,328,080 | Ellis | Jan. 13, 1920 |
| 1,606,618 | Ellis | Nov. 9, 1926 |
| 1,606,619 | Ellis | Nov. 9, 1926 |
| 1,647,399 | Ellis | Nov. 1, 1927 |
| 1,894,097 | James | Jan. 10, 1933 |
| 1,943,519 | Denning | Jan. 16, 1934 |
| 2,067,327 | Leatherman | Jan. 12, 1937 |